(12) United States Patent
Garoff et al.

(10) Patent No.: US 10,941,297 B2
(45) Date of Patent: Mar. 9, 2021

(54) THERMALLY REACTIVE THERMOPLASTIC INTERMEDIATE PRODUCT AND METHOD OF MANUFACTURING THEREOF

(71) Applicant: Stora Enso OYJ, Helsinki (FI)

(72) Inventors: Niklas Garoff, Skarholmen (SE); Dimitri Areskogh, Stockholm (SE); Goran Gellerstedt, Sollentuna (SE); Stephen Walter, Aachen (DE); Pavan Kumar Manvi, Aachen (DE); Gunnar Seide, Aachen (DE); Thomas Gries, Aachen (DE)

(73) Assignee: Stora Enso OYJ, Helsinki (FI)

( * ) Notice: Subject to any disclaimer, the term of this patent is extended or adjusted under 35 U.S.C. 154(b) by 434 days.

(21) Appl. No.: 14/442,186

(22) PCT Filed: Nov. 7, 2013

(86) PCT No.: PCT/IB2013/059965
§ 371 (c)(1),
(2) Date: May 12, 2015

(87) PCT Pub. No.: WO2014/076612
PCT Pub. Date: May 22, 2014

(65) Prior Publication Data
US 2016/0297970 A1 Oct. 13, 2016

(30) Foreign Application Priority Data
Nov. 13, 2012 (CH) .................. 1251284-4

(51) Int. Cl.
*C08L 97/00* (2006.01)
*D01F 9/17* (2006.01)
(Continued)

(52) U.S. Cl.
CPC ............ *C08L 97/005* (2013.01); *C25C 3/125* (2013.01); *D01D 1/02* (2013.01); *D01D 5/08* (2013.01); *D01F 1/10* (2013.01); *D01F 9/17* (2013.01)

(58) Field of Classification Search
CPC ...................................................... C08L 97/005
See application file for complete search history.

(56) References Cited

U.S. PATENT DOCUMENTS 2,247,207 A    6/1941 Schorger
3,461,082 A    8/1969 Sugio Otani et al.
(Continued)

FOREIGN PATENT DOCUMENTS

CN    102361914    2/2012
CN    102634872 A    8/2012
(Continued)

OTHER PUBLICATIONS

Office Action for corresponding Taiwanese Patent Application No. 102139785, dated Mar. 24, 2017.
(Continued)

*Primary Examiner* — Peter F Godenschwager
(74) *Attorney, Agent, or Firm* — Greer, Burns & Crains, Ltd.

(57) ABSTRACT

The present disclosure relates to a thermally reactive thermoplastic intermediate product, in the form of a shaped body, wherein the intermediate comprises a composition, wherein the composition comprises a purified or optionally unpurified softwood lignin and at least a first additive.

20 Claims, 1 Drawing Sheet

(51) Int. Cl.
*D01F 1/10* (2006.01)
*D01D 1/02* (2006.01)
*D01D 5/08* (2006.01)
*C25C 3/12* (2006.01)

(56) References Cited

U.S. PATENT DOCUMENTS

| | | | |
|---|---|---|---|
| 3,519,581 | A | 7/1970 | Moorer et al. |
| 3,723,609 | A | 3/1973 | Mansmann et al. |
| 6,054,562 | A | 4/2000 | Kurple |
| 6,172,204 | B1* | 1/2001 | Sarkanen .............. C07G 1/00 106/164.01 |
| 2003/0212157 | A1 | 11/2003 | Kadla et al. |
| 2008/0317661 | A1 | 12/2008 | Eckert et al. |
| 2010/0311943 | A1 | 12/2010 | Lallave Rivas et al. |
| 2011/0054154 | A1* | 3/2011 | Park ...................... C07G 1/00 530/507 |
| 2011/0274612 | A1 | 11/2011 | Wohlmann et al. |
| 2012/0003471 | A1 | 1/2012 | Bissett et al. |

FOREIGN PATENT DOCUMENTS

| | | |
|---|---|---|
| JP | 01239114 H | 9/1989 |
| JP | 2008174857 A | 7/2008 |
| JP | 2010242248 A | 10/2010 |
| JP | 2012515241 A | 7/2012 |
| WO | 2012003070 A1 | 1/2012 |
| WO | 2012038259 | 3/2012 |
| WO | 2012112108 | 8/2012 |
| WO | 2012138802 | 10/2012 |

OTHER PUBLICATIONS

Examination Report for corresponding Chilean Patent Application No. 01288-2015, dated Mar. 22, 2017.
First Office Action issued by the Chinese Patent Office dated Apr. 14, 2016.
Second Office Action issued by the Chinese Patent Office for corresponding Chinese Patent Application No. 201380065587.8, dated Dec. 15, 2016.
European Patent Office, Supplementary European Search Report and Opinion, dated Sep. 14, 2016.
Written Opinion of the International Searching Authority, PCT/IB2013/059965, dated Feb. 25, 2014.
International Search Report, International Searching Authority, PCT/IB2013/059965, dated Feb. 25, 2014.
Japanese Office Action (with Translation) for Japanese Patent Application No. 2015-541277, dated Oct. 2, 2017.

* cited by examiner

THERMALLY REACTIVE THERMOPLASTIC INTERMEDIATE PRODUCT AND METHOD OF MANUFACTURING THEREOF

This application is a U.S. National Phase under 35 U.S.C. § 371 of International Application No. PCT/IB2013/059965, filed Nov. 7, 2013, which claims priority under 35 U.S.C. §§ 119 and 365 to Swedish Application No. 1251284-4, filed Nov. 13, 2012.

TECHNICAL FIELD

The present document relates to a thermally reactive thermoplastic intermediate product. More particularly, the present disclosure relates to an intermediate product made from a composition containing purified or optionally unpurified softwood lignin and at least a first additive. The present document further relates to a method for providing the intermediate and uses of the intermediate.

BACKGROUND

The size of the global carbon market is today about 42 Billion EUR. Carbon electrodes for aluminum production account for 19 Billion EUR, Graphite electrodes for electric furnaces for 6 Billion EUR and carbon fibers for about 1 Billion EUR. Other major carbon products include carbon black (11 Billion EUR) and activated carbon (2 Billion EUR). The production of carbon and graphite electrodes and carbon fiber is associated with high costs and a high carbon dioxide footprint due to the use of oil-based raw materials and energy intensive manufacturing processes. Carbon and Graphite electrodes are made from a so called "green electrode" (comprised of calcined coke) that is carbonized at temperatures around 1000° C. for about two weeks. When producing graphite electrodes the carbonization step is followed by a graphitization step at 3000° C. Carbon and graphite electrodes must have high electrical conductivity, i.e. low resistivity. The resistivity of commercial graphite electrodes is about 500 µΩcm (www.sglgroup.com). Regarding carbon fibers, their high price is an important obstacle for further market penetration, especially for use in large-mass market segments such as in the automotive, maritime, wind energy, and construction areas. The production of carbon fibers is a costly process due to expensive raw materials (poly-acrylonitrile, PAN) and an energy intensive manufacturing process.

Lignin may be an alternative raw material for carbon electrodes, graphite electrodes and carbon fiber due to its potentially large availability, its high content of carbon (>60%) and expected lower production costs. In addition, lignin is a renewable material.

During chemical pulping cellulosic fibers are separated from softwoods, hardwoods, and annual plant biomass, for further processing to paper, board and tissue products. Kraft pulping is the dominant chemical pulping process. Other processes include soda pulping, sulfite pulping and the organosols process. In alkaline pulping (i.e. kraft and soda pulping), large quantities of lignin become dissolved in the alkaline pulping liquor, known as black liquor, a highly alkaline complex mixture containing used cooking chemicals, solubilized wood lignin, carbohydrates and organic acids. From there the lignin can be further processed to energy by combustion of the partly evaporated black liquor or, alternatively, be isolated in solid form by addition of acid. The isolated lignin can thereafter be used as a biofuel, or as raw material for chemicals and materials, e.g. carbon fibers.

Using lignin as a raw material for carbon and graphite electrodes and carbon fiber has several advantages: Lignin is a cost-efficient raw material, it is renewable and present in large amounts in industrial black liquors from pulp mills.

The production of carbon electrodes, graphite electrodes and carbon fibers from lignin requires that the lignin can be shaped to an intermediate product (green electrode or fiber precursor, respectively) via e.g. melt-extrusion. That intermediate should be thermoplastic and thermally reactive so that carbon-carbon bonds can be formed and the carbon content increased in the subsequent high-temperature treatment steps. In particular, carbon fiber precursors must be thermally reactive in the stabilization step of the manufacturing process. Stabilization aims at transforming the thermoplastic precursor fiber into a thermoset since, otherwise, the precursor fiber would melt when subjected to the high temperatures during carbonization. Melt extrusion requires that the lignin can melt within a certain temperature range above its glass transition temperature and below its decomposition temperature, i.e. it must have thermoplastic properties. Softwood lignins have higher thermal reactivity than hardwood lignins but they have, however, proven to be more difficult to melt-extrude, which is believed to be due to their higher degree of cross linking. Lignin modification and/or addition of a plasticizer are necessary to facilitate melt spinning of softwood lignin. In US 20080317661 softwood lignin is completely acetylated and melt-extruded to a lignin fiber. In WO/EP2010/050185 lignin derivatives are disclosed, in which the free hydroxyl groups in lignin have been completely derivatized using e.g. divalent acid chloride together with monovalent acid anhydride. The resulting lignin derivatives are thermoplastic and can be spun to filaments. The absence of free hydroxyl groups results, however, in low thermal reactivity of the lignin derivative. WO 2012/038259 describes a method that renders softwood lignin meltable for the making of carbon fiber. The method is based on using solvent extracted lignin fractions and degassing the fraction at elevated temperatures. No examples are given regarding carbon fiber obtained from softwood lignin. In addition, this technology is associated with high costs due low extraction yield (typically 25%) and high capital expenditure costs due to solvent-recovery systems. Fractionated hardwood lignin has been demonstrated as plasticizer for softwood lignin for subsequent production of carbon fiber (Ylva Norström et al., Nordic Wood Biorefinery Conference 2011, Stockholm). The disadvantage of this technology is the necessity for two capital-intense lignin extraction plants (one for softwood and one for hardwood) leading to high capital expenditure costs.

There is thus a need for a thermally reactive thermoplastic intermediate product which is renewable, and cost efficient to produce and which can be easily utilized in subsequent applications and processes.

SUMMARY

It is an object of the present disclosure, to provide an improved or alternative thermally reactive thermoplastic intermediate product from a purified or optionally unpurified lignin, which eliminates or alleviates at least some of the disadvantages of the prior art products.

Based on the understanding that softwood lignin allows for a more useful intermediate for subsequent processing, there is provided a thermally reactive thermoplastic intermediate for conversion to carbon products such as carbon electrodes, graphite electrodes or carbon fibers.

More specific objects include providing a composition comprising softwood lignin for the making of said thermally reactive thermoplastic intermediate.

The invention is defined by the appended independent claims. Embodiments are set forth in the appended dependent claims and in the following description and drawings.

According to a first aspect, there is provided a thermally reactive thermoplastic intermediate product, in the form of a shaped body, wherein the intermediate comprises a composition, and wherein the composition comprises a purified softwood lignin and at least a first additive.

By "purified" is meant that the lignin or the corresponding black liquor, e.g. obtained from an alkali pulping process, has been filtered to remove particles and washed to reduce the content of inorganics. According to one embodiment the black liquor has been filtered with membrane filters having a cut-off of 50 kDa. Membrane filtering may be performed at an industrial scale in a cost effective manner, further, this method is environmentally friendly in that no excessive use of solvents is necessary.

According to a second aspect, there is provided a thermally reactive thermoplastic intermediate product, in the form of a shaped body, wherein the intermediate comprises a composition, and wherein the composition comprises an unpurified softwood lignin and at least a first additive.

By "carbon product" is meant for example a carbon electrode, graphite electrode and carbon fiber.

By "shaped body" is meant a melt-extruded body such as, but not limited to, a fiber precursor or green electrode or pellets.

By "thermoplastic intermediate" is meant that the intermediate can melt and thus may be further processed to form a new shaped body through techniques such as melt extrusion, injection molding etc.

By "thermally reactive" is meant that the lignin structure of the intermediate still comprises reactive sites such as free hydroxyl groups, which may provide for an intermediate product that can be further processed into, for instance, a stabilized precursor fiber for carbon fiber production or carbonized to form carbon electrodes or graphite electrodes.

Further, the viscosity of the composition can be controlled by controlling the amount of additives mixed to the lignin.

This intermediate product is thus a cost-efficient product, both in that it is produced in a cost efficient manner through melt extrusion, in contrast to solvent extrusion that uses excessive amounts of solvents, and in that it can be converted to carbon products in a cost-efficient manner due to its high thermal reactivity. By using a softwood lignin there is further provided a material which is renewable and as such also environmentally friendly to use as raw material for carbon products e.g. carbon electrodes or graphite electrodes or carbon fibers. Because the intermediate product is thermally reactive there is also provided an intermediate material which is able to be treated in subsequent processes such as different types of thermal processes, where the intermediate product is turned into a carbon or graphite electrode or into a stabilized fiber in carbon fiber production. This means that a stabilized precursor filament may be formed from the intermediate product, which in turn may be highly reactive and which may easily carbonize into a carbon fiber.

According to the above embodiments the additives in the composition may allow for an alteration of the rheological properties of said composition. As the skilled person would realize the addition of different amounts will influence the viscosity in different degrees and it is thus possible to control the viscosity depending on what the intermediate product is intended to be used for.

According to one embodiment of the first and second aspect the at least first additive in said composition may be a lignin solvent.

By "lignin solvent" is meant a solvent which is capable of breaking inter- and intramolecular bonds such as van der Waals bonds and hydrogen bonds in such a manner that the structure opens up for other additives to be able to react or interact with the structure.

By adding a lignin solvent there is provided a way of altering the processability, and thereby the flowability and hence also the viscosity of the composition. Addition of solvent lowers the glass transition temperature of the blend compared to that of the original lignin. The lignin solvent is preferably added in amounts corresponding to a fraction of the weight of the softwood lignin. The lignin solvent is thus not added for the purpose of dissolving the lignin, but merely to such an extent that the molecular structure is partially opened. The softwood lignin may, for instance, be a powder and the lignin solvent may thus be added in such low amounts that the lignin remains in a solid state. In effect, there is achieved a composition to which a solvent has been added so that the composition may be extruded, for example via melt spinning, as opposed to solvent spinning which requires excessive amounts of solvent to dissolve the lignin.

This way of adding a small amount of solvent, thus provides for a composition that can be melt-extruded to a shaped body. Surprisingly, addition of minor amounts of solvent made it possible to melt-extrude the softwood lignin whereas solvent spinning in the same solvent is very difficult, if even possible.

The lignin solvent may be an aprotic polar solvent, such as an aliphatic amide, such as dimethylformamide (DMF) or dimethylacetamide (DMAc), a tertiary amine oxide, such as N-methylmorpholine-N-oxide (NMMO), dimethylsulfoxid (DMSO), ethylene glycol, di-ethylene glycol, low-molecular-weight poly ethylene glycol (PEG) having a molecular weight between 150 to 20.000 g/mol or ionic liquids or any combination of said solvents and liquids.

According to another embodiment the composition may further comprise at least a second additive.

According to yet an alternative embodiment the composition may even further comprise a third additive.

The second or third additive may be a reactive blocking agent.

By "reactive blocking agent" is meant an agent that is capable of forming covalent bonds to the hydroxyl groups of the lignin molecule during the melt extrusion and block the strong inter- and intramolecular forces in the lignin macromolecule, such as van-der Waals bonds and hydrogen bonds. Thereby the processability, and thereby the flowability and hence also the viscosity of the composition in the extruder can be controlled. This agent should however preferably be added to such an extent that there free hydroxyl groups remain in the lignin molecule in that the thermal reactivity of the intermediate product is maintained.

The second or third additive may be an alignment agent.

By "alignment agent" is meant an agent that is miscible with the softwood lignin and which is capable of interacting with the lignin macromolecules, such that they become more aligned along the main direction, i.e. along the fiber direction, which significantly enhances deformation behavior of the molten composition during extrusion and spinning processes.

According to one embodiment of the first aspect the second additive may be a reactive blocking reagent and the third additive may be an alignment agent. According to this embodiment the reactive and blocking agent is added before the alignment additive.

According to an alternative at least 1%, preferably at least 50% and most preferably at least 95% of free hydroxyl groups present in the fractionated softwood lignin remain unaffected.

A high degree of unaffected free hydroxyl groups in the lignin may provide for an intermediate which is thermally reactive.

According to the one embodiment of the first aspect the product may be re-meltable.

According to a third aspect there is provided a method for producing a thermoplastic intermediate product being thermally reactive, comprising the steps of; providing purified softwood lignin as a dry powder, adding at least a first additive to the softwood lignin, such that it substantially remains in a solid state, wherein the first additive is a lignin solvent, capable of opening up the lignin structure. According to a fourth aspect there is provided a method for producing a thermoplastic intermediate product being thermally reactive, comprising the steps of; providing unpurified softwood lignin as a dry powder, adding at least a first additive to the softwood lignin, such that it substantially remains in a solid state, wherein the first additive is a lignin solvent, capable of opening up the lignin structure.

By "substantially remains in a solid state" is meant that the lignin solvent is not added in excess in order to dissolve the lignin.

By "capable of opening up the lignin structure" is meant that the lignin solvent may open up the lignin structure slightly to decrease the viscosity of the composition and allow for other additives to interact or react with the lignin molecule. By adding the lignin solvent there is also provided for a composition which in itself can be shaped to a body via melt-extrusion, for instance to make green electrodes for carbon or graphite electrodes or fiber precursors for carbon fibers. Surprisingly, addition of minor amounts of solvent improves melt-extrusion whereas solvent spinning in the same solvent is very difficult, if even possible.

According to one embodiment the treatment temperature for shaping a fiber precursor from the thermoplastic composition preferably is kept below 250° C., and even more preferable below 200° C., as above this temperature the softwood lignin starts to cross-link. The corresponding treatment time preferably is kept below 30 minutes.

According to this embodiment the lignin solvent is thus added in such a way that the lignin structure is opened up but such that the lignin is not dissolved in the solvent.

The lignin solvent may be an aprotic polar solvent, such as an aliphatic amide, such as dimethylformamide (DMF) or dimethylacetamide (DMAc), a tertiary amine oxide, such as N-methylmorpholine-N-oxide (NMMO), dimethylsulfoxid (DMSO), ethylene glycol, di-ethylene glycol, low-molecular-weight poly ethylene glycol (PEG) having a molecular weight between 150 to 20.000 g/mol or ionic liquids or any combination of said solvents and liquids.

According to one embodiment of the second aspect the method may further comprise adding at least a second additive.

According to yet an alternative embodiment the method may comprise adding at least a third additive.

The second or third additive may be a reactive blocking agent or an alignment agent.

A second (or third) additive in the form of a reactive blocking agent or an alignment additive is thus preferably added to the thermoplastic composition when the composition is intended for subsequent processing in melt extrusion etc., as this additive improves the rheological properties for the making of the intermediate for these types of purposes and processes.

The second additive may be said reactive blocking agent, and the third additive may be said alignment agent.

According to this embodiment the reactive blocking agent is thus added before the alignment agent.

According to one embodiment of the second aspect the first, second and third additives may be added in-situ into an existing apparatus such as an extruder. This means that the method may be implemented into an existing production without any modifications. This provides for a method which is even further cost effective.

According to one embodiment said second additive is added after a treatment period from the addition of said first additive. This embodiment thus allows for the first additive, i.e. the lignin solvent to interact with the lignin structure such that it is slightly loosened or opened up before the second additive is added and such that viscosity is decreased to the target value.

According to one embodiment the reactive blocking agent may be able to react in-situ with the lignin during melt-extrusion.

According to a fifth aspect there is provided a thermally reactive thermoplastic intermediate product obtainable by the method according to the third or fourth aspect.

According to a sixth aspect there is provided the use of the thermally reactive thermoplastic intermediate product according to the first, second and fifth aspect for forming a carbon product.

The carbon product may be a carbon fiber.

Such a fiber may subsequently processed through conventional methods such as stabilization and carbonization.

According to one alternative the carbon product may be a carbon or graphite electrode.

BRIEF DESCRIPTION OF THE DRAWINGS

Embodiments of the present solution will now be described, by way of example, with reference to the accompanying schematic drawings.

DESCRIPTION OF EMBODIMENTS

Figure 1:
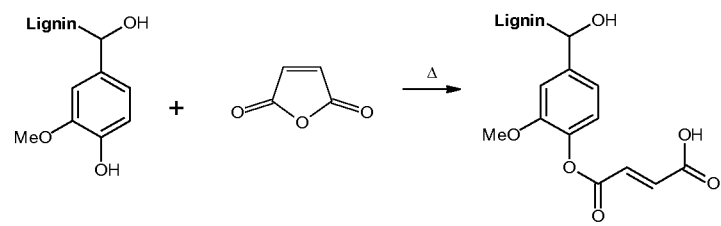
FIG. 1 shows the reaction between softwood lignin and an anhydride, exemplified by maleic anhydride.

According to one embodiment a method for producing a thermoplastic thermally reactive intermediate product is provided. In this method a purified or optionally unpurified softwood lignin is provided as a dry powder, which means that the moisture content in the lignin is less than 10% by weight. In this method a first additive is added to the dry powder lignin. The amount of additive is performed at an amount where the additive does not dissolve the dry powder lignin, but leaves it in a substantially solid state.

According to one alternative embodiment a method for producing a thermoplastic thermally reactive intermediate product is provided. In this method an unpurified softwood lignin is provided as a dry powder, which means that the moisture content in the lignin is less than 10% by weight. In this method a first additive is added to the dry powder lignin. The amount of additive is performed at an amount where the additive does not dissolve the dry powder lignin, but leaves it in a substantially solid state.

According to one embodiment the first additive may be added in an amount of 1-20% by weight of the dry powder lignin.

The first additive may be a lignin solvent, which is capable of opening up the lignin structure.

Examples of such lignin solvents are aprotic polar solvents, such as aliphatic amides, such as dimethylformamide (DMF) or dimethylacetamide (DMAc), tertiary amine oxides, such as N-methylmorpholine-N-oxide (NMMO), dimethylsulfoxid (DMSO), ethylene glycol, di-ethylene glycol, low-molecular-weight poly ethylene glycol (PEG) having a molecular weight between 150 to 20.000 g/mol or ionic liquids or any combination of said solvents and liquids.

According to one alternative embodiment the lignin is impregnated with a solution comprised of 50% water and 50% of a lignin solvent that is water-soluble having a boiling point higher than that of water. Eight parts of lignin may be added to two parts of the solution. The mixture, still being comprised of lignin in non-dissolved state, may be freeze-dried or air-dried to gently remove the water, resulting in a solvent-impregnated lignin. By this method the solvent gets evenly distributed in the lignin.

The method further provides for the addition of a second or a third additive or both a second and a third additive. The second or third additive may either be a reactive blocking agent or an alignment agent. This means that after the addition of the lignin solvent either a reactive blocking agent or an alignment agent may be added. In an alternative embodiment both a reactive blocking agent and an alignment agent may be added, and in any consecutive order. However, according to a preferred embodiment the reactive blocking agent is added before the alignment additive.

According to one embodiment the reactive blocking agent may be an anhydride, such as phthalic acid anhydride. According to another embodiment the anhydride is a maleic acid anhydride. Surprisingly, the reactive blocking agent reacts in-situ with the lignin during the extrusion process, i.e. the spinning process is in fact a reactive spinning process. Surprisingly, the intermediate can be re-melt to form a new shaped body, such as a precursor fiber. This shows that the intermediate, in fact is a thermoplastic intermediate.

In FIG. 1 the reaction between lignin and an anhydride is shown. Oxyalkylation of phenolic hydroxyls with maleic anhydride reduces the number of phenolic and aliphatic hydroxyl groups and increases carboxylic hydroxyl groups.

According to one embodiment, the alignment agent may be a high-molecular weight polyethylene glycol (PEG) with a molecular weight above 20.000 g/mol. According to another embodiment such an alignment agent can be polyethylene oxide (PEO). The addition of the alignment agent is based on the knowledge that the lignin molecule is a non-linear macromolecule with low molecular mass, and thus is difficult to bring into conformity during spinning, which makes melt spinning difficult. Interaction with the alignment agent increases spinning performance.

According to one embodiment the second additive is added after a treatment period to allow the lignin solvent, to interact with the lignin structure to open it up in order to facilitate for any subsequent additives to be able to interact and/or react with the lignin molecule. The length of the treatment period may depend on the extrusion apparatus used and can be adjusted in several ways, known to those skilled in the art, e.g. by altering the geometry of screw segments, screw speed and point of addition. The treatment period is preferably optimized to prevent cross linking of the lignin during extrusion.

Through the above described method a thermally reactive thermoplastic intermediate product is provided, in the form of a shaped body. The intermediate product may be used for forming or making carbon products, wherein the intermediate comprises and purified softwood lignin, and wherein the intermediate has been made from a composition containing said purified softwood lignin and at least a first additive.

The thermally reactive thermoplastic intermediate product may subsequently be treated by known methods for forming carbon products, such as those for producing carbon fibers. Such methods are also described in the below examples and includes steps as melt-spinning the composition into a carbon fiber, and stabilizing and finally carbonizing the fiber, which are known to the person skilled in the art.

The intermediate product obtained by the above method is particularly suitable for thermal treatments since it is "thermally reactive" which means that the lignin structure of the intermediate still comprises reactive sites such as free hydroxyl groups. These free hydroxyl groups provides for an intermediate product that can be further processed into, for instance, a stabilized precursor fiber for carbon fiber production or carbonized to form carbon or graphite electrodes.

Preferred features of each aspect of the invention are as for each of the other aspects mutatis mutandis. The prior art documents mentioned herein are incorporated to the fullest extent permitted by law. The invention is further described in the following examples, which do not limit the scope of the invention in any way. Embodiments of the present invention are described as mentioned in more detail with the aid of examples of embodiments the only purpose of which is to illustrate the invention and are in no way intended to limit its extent.

EXAMPLES

In the below, non-limiting examples of the present invention will be described.

Example 1

Industrial black liquor was filtered through using a ceramic membrane having a cut-off of 50 kDa. The permeate fraction was used for subsequent lignin precipitation via acidification using carbon dioxide. The solid crude lignin was washed twice with diluted sulfuric acid and dried to 95% dry solids. Double washing reduced the ash content from 0.42% to 0.08% by weight of dry lignin.

Example 2

Industrial black liquor was used for lignin precipitation via acidification using carbon dioxide. The solid crude lignin was washed twice with diluted sulfuric acid and dried to dried to 95% dry solids.

Example 3

Purified softwood lignin from example 1 was fed into a twin-screw laboratory extruder (DSM Xplore micro-compounder) in attempt to produce a filament. The temperature was 180° C. at the screws and 200° C. at the nozzle exit. A filament could not be spun due to the melt having a viscosity that was too high.

Example 4

Purified softwood lignin from example 1 was mixed with 4% dimethylsulfoxide (DMSO) and the mixture was melt-spun at 180° C. at 50 m/min maximum winding speed. Example 4 shows that addition of small amount of lignin solvent makes it is possible to melt-extrude softwood lignin that per se is not melt-extrudable. The resulting lignin fiber (the intermediate product) was stabilized in air. No glass transition point was observed for the stabilized fiber showing that stabilization was complete. The stabilized fiber was carbonized to a carbon fiber in nitrogen atmosphere.

Example 5

Purified softwood lignin from example 1 was mixed with 10% dimethylsulfoxide (DMSO) and the mixture was melt-spun at 170° C. screw temperature and 180° C. nozzle exit temperature at 200 m/min maximum winding speed, which is the maximum winding speed of the device that was used. The viscosity of the melt was lower than in example 4. Example 5 shows that higher addition of lignin solvent decreases viscosity and improves spinning speed. The resulting lignin fiber (the intermediate product) was stabilized and carbonized to a carbon fiber.

Example 6

Purified softwood lignin from example 1 was mixed with 5% dimethylsulfoxide (DMSO) followed by 10% maleic acid anhydride (MAA), a reactive blocking agent. The resulting mixture was melt-spun at 180° C. screw temperature and 190° C. nozzle exit temperature at 80 m/min maximum winding speed. The produced lignin fiber (the intermediate product) was easily stretchable. Example 6 shows that MAA improves spinning performance and fiber stretching.

Example 7

Purified softwood lignin from example 1 was mixed with 7% Dimethylsulfoxide (DMSO) followed by 7% phthalic acid anhydride (PAA). The resulting mixture was melt-spun at 180° C. screw temperature and 190° C. nozzle exit temperature at 200 m/min maximum winding speed. Example 7 shows that PAA improves spinning performance. The resulting lignin fiber (the intermediate product) was stabilized and carbonized to a carbon fiber.

Examples 8a, 8b and 8c

The following experiments were carried out to check whether oxyalkylation may occur between the lignin and an anhydride at conditions that exist in the melt extruder.

Example 8a

Dry purified softwood lignin from example 1 was dissolved in DMSO at a concentration of 0.25 g/l. To the mixture, maleic anhydride was added in amounts 7% of lignin dry weight. The mixture vessels were saturated with nitrogen, capped and heated to 180° C. for 5 minutes during which reaction took place.
After the completion of the reaction, the lignin was precipitated in de-ionised water, filtered, extensively washed and dried under vacuum at 80° C. overnight. Analysis of the oxyalkylated lignin was performed using 31P-NMR. Aliphatic hydroxyls groups decreased from 1.9 to 1.2 mmol/g and carboxylic hydroxyls increased from 0.4 to 0.7 mmol/g. These changes are significant and show that, indeed, maleic anhydride reacts with the softwood lignin at temperatures and reaction times that exist in the melt extruder.

Example 8b

Dry purified softwood lignin from example 1 was treated with phthalic anhydride according to the same procedure as that described in example 8a. 31P-NMR showed that aliphatic hydroxyls groups decreased from 1.9 to 1.4 mmol/g and carboxylic hydroxyls increased from 0.4 to 0.8 mmol/g. These changes are significant and show that, indeed, phthalic anhydride reacts with the softwood lignin at temperatures and reaction times that exist in the melt extruder.

Example 8c

Figure 2:
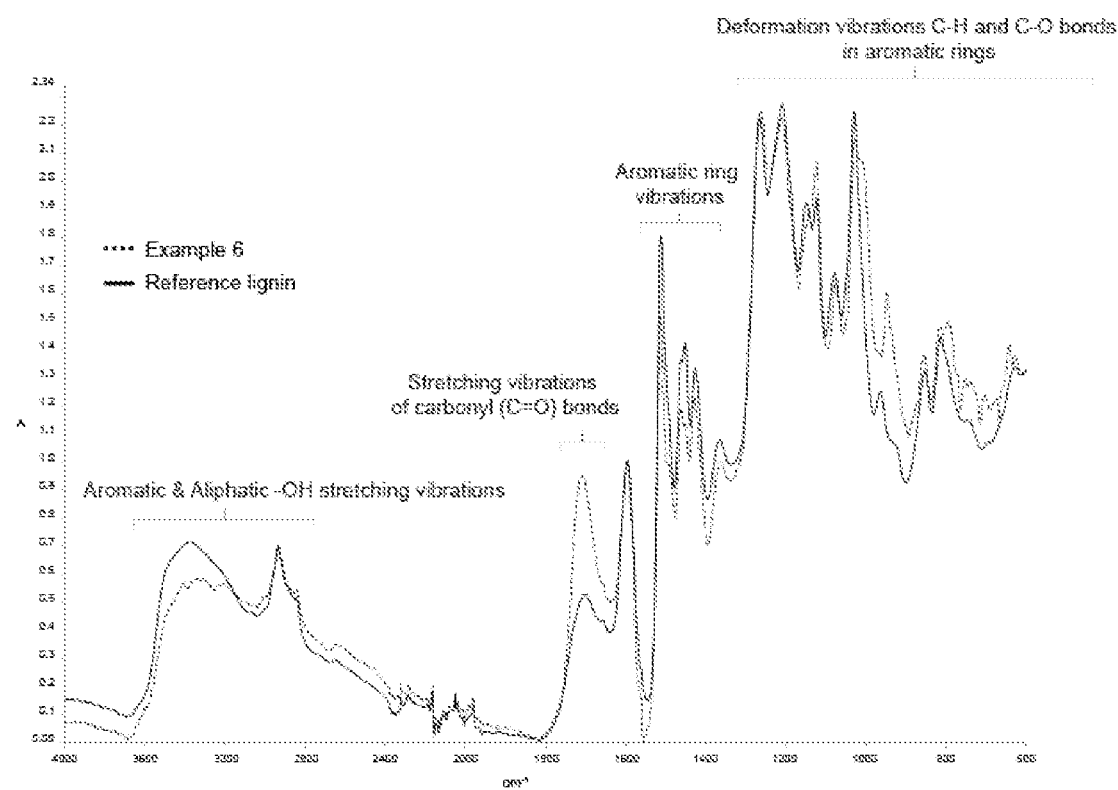
FIG. 2 shows FTIR spectra of the lignin from example 1 and the lignin fibers from example 7, respectively.

The lignin from example 1 and the lignin fiber from example 7 were analyzed using FTIR, as shown in FIG. 2. Both lignin and lignin fiber showed a significant absorbancy at 3677-3042 $cm^{-1}$, corresponding to stretch vibrations of aromatic and aliphatic hydroxyl groups. The peak area of the lignin fibers within this interval was only 15% smaller than that of the lignin showing that 85% of hydroxyl groups remain intact after extrusion. This proofs that the lignin fiber still is thermally reactive, i.e. the intermediate product is in fact a reactive intermediate product. In case of the lignin fiber, absorbancy was higher at 1750-1650 $cm^{-1}$, corresponding to stretch vibrations of carbonyl groups, due to the introduction of carboxyl groups from the reaction of lignin with phthalic anhydride.

Example 9

Purified softwood lignin from example 1 was mixed with 5% dimethylsulfoxide (DMSO) followed by 7% phthalic acid anhydride. The resulting mixture was melt-spun at 180° C. screw temperature and 190° C. nozzle exit temperature at 100 rpm maximum winding speed. The resulting lignin fiber was crushed to a powder and the powder was fed into the melt extruder. A filament could be spun at 180° C. screw temperature and 190° C. nozzle exit temperature at 200 rpm maximum winding speed. Examples 9 and 10 clearly demonstrate that the intermediate product is in fact a thermally reactive and thermoplastic intermediate product.

Example 10

Purified softwood lignin from example 1 was mixed with 5% dimethylsulfoxide (DMSO) followed by 10% polyethylene oxide, an alignment agent. The resulting mixture was melt-spun at 180° C. screw temperature and 190° C. nozzle exit temperature at 200 rpm maximum winding speed. Example 10 shows that an alignment agent improves spinning performance.

Example 11

Softwood lignin from example 2 was mixed with 10% PEG (Average molecular weight 400). The resulting mixture was melt-spun at 180° C. screw temperature and 190° C. nozzle exit temperature at 200 rpm maximum winding speed. Example 11 shows that unpurified lignin can be used for extrusion. The resulting lignin fiber was stabilized and carbonized to a carbon fiber.

Example 12

Softwood lignin from example 2 was mixed with 10% PEG (Average molecular weight 400 g/mol). The resulting mixture was melt-spun to multiple filaments at 180° C. screw temperature and 190° C. nozzle exit temperature using a Lab-Compounder KEDSE 20/40" from Brabender GmbH & CO. KG, Duisburg, Germany. The number of holes in the spinneret was 62 and the hole diameter 0.8 mm. The resulting lignin fiber was successfully wound to a bobbin at winding speeds up to 350 m/min and the diameter of the filaments produced was about 35 µm.

Example 13

The electrical resistivity of carbon fiber from example 11 was measured using a LCR meter. The measured resistivity was 0.6 µΩ·cm. For comparison, the resistivity of a commercial carbon fiber was also measured giving a value of 1.6 µΩ·cm. Surprisingly, the measured receptivity of the carbon fiber from example 11 was lower than that of the commercial carbon fiber and much lower than that of commercial graphite electrodes (about 500 µΩ·cm, www.Sglggroup.com). Example 13 shows, in fact, that the carbonized product derived from the thermally reactive thermoplastic intermediate product has excellent electrical conductivity and can function as a carbon or graphite electrode.

FIG. 2 illustrates FTIR spectra of the lignin from example 1 and the lignin fiber from example 6, respectively.

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted methods or compositions may be combined with other known methods or compositions. Other aspects, advantages and modifications within the scope of the invention will be apparent to those skilled in the art to which the invention pertains.

The invention claimed is:

1. A thermally reactive thermoplastic intermediate product in the form of a shaped body consisting essentially of a melt-extrudable composition, wherein the composition consists of a mixture of a purified or an unpurified softwood lignin dry powder, a lignin solvent capable of opening up the lignin structure, a reactive blocking agent, and optionally an alignment agent, wherein the lignin solvent is ethylene glycol, di-ethylene glycol or a low-molecular-weight poly ethylene glycol (PEG) having a molecular weight between 150 to 20,000 g/mol, and wherein the lignin solvent is added in an amount of 1 to 10% by weight of the lignin powder so that after the addition of the lignin solvent the lignin powder remains undissolved and a powder in a substantially solid state, where the reactive blocking agent is selected from the group consisting of anhydrides, and wherein the optional alignment agent is selected from the group consisting of high-molecular-weight poly ethylene glycol (PEG) having a molecular weight above 20,000 g/mol, or polyethylene oxide (PEO), or combinations thereof.

2. The intermediate product as claimed in claim 1, wherein the lignin solvent further comprises one or more of an aliphatic amide, dimethylformamide (DMF), dimethylacetamide (DMAc), a tertiary amine oxide, N-methylmorpholine-N-oxide (NMMO), dimethylsulfoxide (DMSO), or ionic liquids or any combination of said solvents and liquids.

3. The intermediate product as claimed in claim 1, wherein the alignment agent is the high-molecular-weight poly ethylene glycol (PEG) having a molecular weight above 20,000 g/mol.

4. The intermediate product as claimed in claim 1, wherein the product is re-meltable.

5. The intermediate product as claimed in claim 1, wherein at least 50% of free hydroxyl groups present in the purified softwood lignin remain unreacted.

6. The intermediate product as claimed in claim 1, wherein after addition of the lignin solvent, the lignin is solvent-impregnated.

7. The intermediate product as claimed in claim 1 wherein the lignin solvent is the low-molecular-weight poly ethylene glycol.

8. The intermediate product as claimed in claim 1, wherein the lignin solvent is added in an amount of 1 to 7% by weight of the lignin powder.

9. A thermally reactive thermoplastic intermediate product, in the form of a shaped body, wherein the intermediate product comprises a melt-extrudable composition, wherein the composition comprises a mixture of a purified or an unpurified softwood lignin dry powder and at least one additive, wherein the at least one additive is a lignin solvent capable of opening up the lignin structure, wherein the lignin solvent is selected from the group consisting of an aprotic polar solvent, an aliphatic amide, dimethylformamide (DMF), dimethylacetamide (DMAc), a tertiary amine oxide, N-methylmorpholine-N-oxide (NMMO), dimethylsulfoxide (DMSO), or ionic liquids or any combination of said solvents and liquids, and wherein the lignin powder remains in a substantially solid state.

10. The intermediate product as claimed in claim 9, wherein the lignin solvent is added in an amount of 1 to 20% by weight of the lignin powder.

11. A thermoplastic intermediate product in the form of a shaped body wherein the intermediate product consists essentially of a composition,
wherein the composition consists essentially of a purified softwood lignin, the lignin structure of the intermediate product comprising free hydroxyl groups, a first additive, and a second additive,
wherein the first additive is an aprotic polar solvent, selected from a group consisting of (i) an aliphatic amide including dimethylformamide (DMF) or dimethylacetamide (DMAc), (ii) a tertiary amine oxide including N-methylmorpholine-N-oxide (NMMNO), (iii) dimethylsulfoxide (DMSO), (iv) ethylene glycol, (v) di-ethylene glycol and (vi) a low-molecular-weight poly ethylene glycol (PEG) having a molecular weight between 150 to 20,000 g/mol, wherein the amount of the first additive is an amount of 1-20% by weight of dry powder lignin, and wherein the second additive is a reactive blocking reagent including an acid anhydride.

12. The intermediate product as claimed in claim 11, wherein the lignin solvent is the low-molecular-weight poly ethylene glycol (PEG) having the molecular weight between 150 to 20,000 g/mol.

13. The intermediate product as claimed in claim 11, wherein the lignin solvent is added in an amount of 1 to 7% by weight of the lignin powder.

14. A method for producing a thermoplastic intermediate product being thermally reactive, comprising the steps of:
providing a purified softwood lignin as a dry powder or an unpurified softwood lignin as a dry powder;
adding a lignin solvent, a reactive blocking agent, and optionally an alignment agent, to the purified of unpurified softwood lignin powder to form a composition consisting essentially of the lignin solvent, the reactive blocking agent, and optionally the alignment agent;

wherein the lignin solvent is capable of opening up the lignin structure, wherein the lignin solvent is ethylene glycol, di-ethylene glycol or a low-molecular-weight poly ethylene glycol (PEG) having a molecular weight between 150 to 20,000 g/mol, and wherein the lignin solvent is added in an amount of 1 to 10% by weight of the lignin powder so that after the addition of the lignin solvent the lignin powder remains undissolved and a powder in a substantially solid state, where the reactive blocking agent is selected from the group consisting of anhydrides, and wherein the optional alignment agent is selected from the group consisting of high-molecular-weight poly ethylene glycol (PEG) having a molecular weight above 20,000 g/mol, or polyethylene oxide (PEO), or combinations thereof.

15. The method as claimed in claim 14, wherein the lignin solvent further comprises one or more of an aliphatic amide, dimethylformamide (DMF), dimethylacetamide (DMAc), a tertiary amine oxide, N-methylmorpholine-N-oxide (NMMO), dimethylsulfoxid (DMSO), or ionic liquids, or any combination of said solvents and liquids.

16. The method as claimed in claim 15, wherein the lignin solvent is the low-molecular-weight poly ethylene glycol (PEG) having the molecular weight between 150 to 20,000 g/mol.

17. The method as claimed in claim 14, wherein the alignment agent is present.

18. The method as claimed in claim 17, wherein the reactive blocking agent is added after a treatment period from the addition of the lignin solvent.

19. The method as claimed in claim 17, wherein the reactive blocking agent is able to react in-situ with the lignin during melt-extrusion.

20. A thermally reactive thermoplastic intermediate product obtainable by the method as claimed in claim 14.

* * * * *